United States Patent
Graf et al.

(10) Patent No.: US 6,734,972 B2
(45) Date of Patent: May 11, 2004

(54) PREDICTING MATERIAL COLOR SHIFTS DUE TO WEATHERING

(75) Inventors: John Frederick Graf, Ballston Lake, NY (US); James Edward Pickett, Schenectady, NY (US); Alexander Isaakovich Shakhnovich, Schenectady, NY (US); James Paul Barren, Scotia, NY (US)

(73) Assignee: General Electric Company, Niskayuna, NY (US)

( * ) Notice: Subject to any disclaimer, the term of this patent is extended or adjusted under 35 U.S.C. 154(b) by 24 days.

(21) Appl. No.: 09/683,103

(22) Filed: Nov. 19, 2001

(65) Prior Publication Data

US 2003/0095258 A1 May 22, 2003

(51) Int. Cl.[7] .................................................. G01J 3/46
(52) U.S. Cl. ........................................ 356/402; 356/319
(58) Field of Search .................................. 356/402, 319

(56) References Cited

U.S. PATENT DOCUMENTS

| | | | |
|---|---|---|---|
| 4,042,469 A | * 8/1977 | Hasegawa et al. | 205/173 |
| 4,635,213 A | 1/1987 | Murata et al. | |
| 4,728,677 A | * 3/1988 | Lacatus et al. | 523/135 |
| 4,887,906 A | * 12/1989 | Koehler | 356/402 |
| 4,931,655 A | * 6/1990 | Yoshida et al. | 250/492.1 |
| 4,968,143 A | * 11/1990 | Weston | 356/328 |
| 5,003,500 A | * 3/1991 | Gerber | 356/402 |
| 5,304,807 A | * 4/1994 | Lin | 250/373 |
| 5,668,633 A | 9/1997 | Cheetham et al. | |
| 5,720,017 A | 2/1998 | Cheetham et al. | |
| 5,723,517 A | 3/1998 | Campo et al. | |
| 5,740,078 A | 4/1998 | Cheetham et al. | |
| 5,841,421 A | 11/1998 | Cheetham et al. | |
| 5,929,998 A | 7/1999 | Kettler et al. | |
| 5,960,110 A | 9/1999 | Usami | |
| 6,108,095 A | 8/2000 | Graf | |

OTHER PUBLICATIONS

ME McKnight, et al, "Workshop on Advanced Methods and Models for Appearance of Coatings and Coated Objects", Journal of Research of the National Institute of Standards and Technology, vol. 102, No. 4, Jul.–Aug. 1997, pp. 489–498.

* cited by examiner

Primary Examiner—F. L. Evans
Assistant Examiner—Kara Geisel
(74) Attorney, Agent, or Firm—David C. Goldman; Patrick K. Patnode (57) ABSTRACT

Predicting material color shifts due to weathering. A color formulation tool determines the concentration of colorants from a color standard. The color formulation tool obtains weathered optical parameters for the color standard from a color database and predicts the color of the color standard from the colorant concentrations and weathered optical parameters.

59 Claims, 5 Drawing Sheets

PREDICTING MATERIAL COLOR SHIFTS DUE TO WEATHERING

BACKGROUND OF INVENTION

This disclosure relates generally to color formulation and more particularly to generating a color formula for a color standard that satisfies predetermined requirements for withstanding exposure to a variety of weathering conditions.

In the plastics industry, plastic manufacturers generally use an accelerated weathering test to define and measure weathering properties of plastics. An accelerated weathering test typically involves the use of a weatherometer, which is an apparatus that exposes materials to artificial and accelerated weathering tests that simulate natural weathering conditions. In particular, the weatherometer uses controlled cycles of ultraviolet radiation, light, salt, electric arcs, water spray and heating elements to simulate the natural conditions of sun, rain and temperature changes. When a plastic manufacturer receives a request to produce a color standard of a plastic material from a customer, the manufacturer has to determine whether it can create a formula that produces the color of the standard such that the formula results in a color that satisfies predetermined accelerated weathering test requirements. Each formula comprises the pigments and dyes (collectively called colorants) that make up the color and the concentration of each of the colorants. Generally, in this scenario, there are a number of colorants that the manufacturer may choose from to produce a color. However, there are only a limited amount of colorants that the manufacturer may use that can satisfy accelerated weathering test requirements because many of the colorants are unstable and break down when exposed to a variety of weathering conditions. Since there are only limited amount of colorants that are stable when exposed to a variety of weathering conditions, the manufacturer relies on the experienced-based knowledge of its technicians to decide whether they can create a formula that can produce the color using only stable colorants. If the technician can produce the color standard from only stable colorants, then the manufacturer produces plaques or samples from the formula of colorants and subjects them to an accelerated weathering test. If the plaques pass the accelerated weathering test then the manufacturer will submit them to the customer for approval; otherwise, the manufacturer will repeat this process for another possible formula and continue until accelerated weathering test requirements are satisfied.

A problem with the above-described process is that the color formulation of deriving a color formula, producing plaques, applying an accelerated weathering test and waiting for approval from a customer takes anywhere from one to two weeks. From a customer's point of view, one to two weeks is too long to wait to hear whether the manufacturer can formulate a color match. Ideally, the customer would like to know within several hours whether the manufacturer can formulate a color match. Therefore, there is a need to expedite the formulation such that lengthy steps like the accelerated weathering test are removed or compressed from the process.

SUMMARY OF INVENTION

In one embodiment of this disclosure, there is a method and computer readable medium that stores instructions for instructing a computer system, to predict the color of a color standard exposed to weathering conditions. This embodiment comprises determining the concentration of the colorants of the color standard; obtaining weathered optical parameters for the color standard; and predicting the color of the color standard from the concentration and weathered optical parameters.

In a second embodiment of this disclosure, there is a method, system and computer readable medium that stores instructions for instructing a computer system, to predict the shift in color of a color standard upon exposure to weathering conditions. This embodiment comprises, measuring the color of the color standard; determining a color formula that matches the color standard; obtaining weathered optical parameters corresponding to the colorants and concentration of colorants used in the color formula; applying a light scatter model to the weathered optical parameters and colorant concentrations to determine the weathered color for color standard; and predicting the shift in color of the color standard upon exposure to weathering conditions from the weathered color.

In another embodiment, there is a method and computer readable medium that stores instructions for instructing a computer system, to determine a color formula that matches a color of a color standard and satisfies accelerated weathering test requirements. This embodiment comprises receiving a sample of the color standard; measuring the color of the color standard; and determining a color formula that produces the measured color and satisfies accelerated weathering test requirements.

In a fourth embodiment, there is a method and computer readable medium that stores instructions for instructing a computer system, to predict the shift in color of a color standard upon exposure to weathering conditions. This embodiment comprises, inputting a color measurement of the color standard; determining a color formula that matches the color standard; obtaining weathered optical parameters corresponding to the colorants and concentration of colorants used in the color formula; applying a light scatter model to the weathered optical parameters and colorant concentrations to determine the weathered color for the color standard; and predicting the shift in color of the color standard upon exposure to weathering conditions from the weathered color.

In still another embodiment, there is a system for determining a color formula that matches a color of a color standard and satisfies accelerated weathering test requirements. In this embodiment, a spectrophotometer measures the color of the color standard. A color database contains a plurality of colorants and optical parameters and weathered optical parameters associated with each of the colorants. A computing unit, coupled to the spectrophotometer and color database, determines a color formula that produces the measured color and satisfies accelerated weathering test requirements.

In a sixth embodiment, there is a color formulation tool. In this embodiment, there is a data extraction component that extracts color data from a color database. A color matching component determines a color formula that matches the color of a color standard and satisfies accelerated weathering test requirements from the extracted color data. A color prediction component predicts the shift in color for the color formula due to weathering.

DETAILED DESCRIPTION

Figure 1:
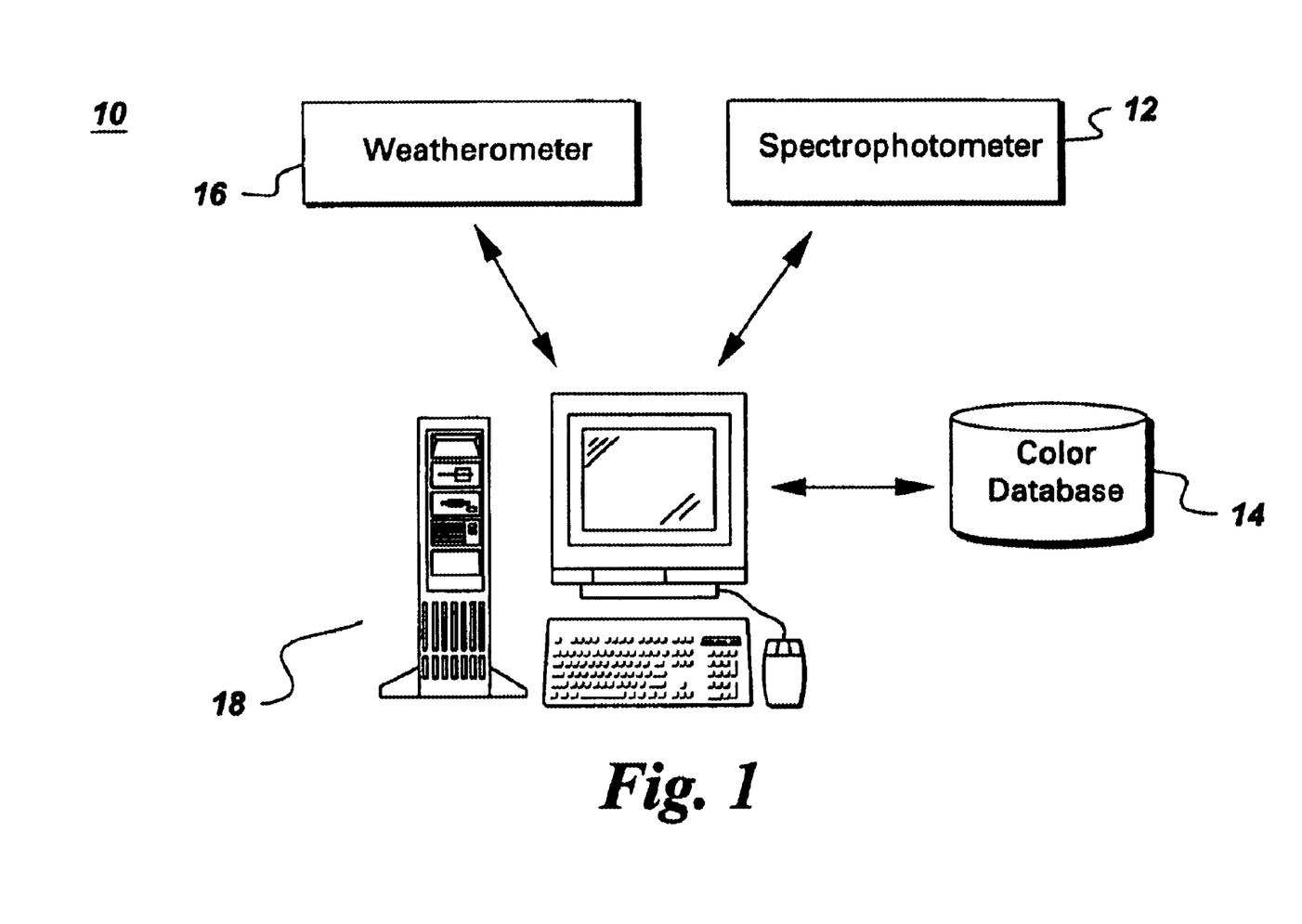
FIG. 1 shows a schematic diagram of a system used to determine a color formula for a color standard.

FIG. 1 shows a schematic diagram of a system 10 used to determine a color formula for a color standard. A color standard is the color of a physical standard made from a material such as a plastic, ceramic, paper, cloth, etc. In the following description, the standard is a plastic material; however, one of ordinary skill in the art will recognize that the principles of this disclosure are equally applicable to other types of standards. The system 10 comprises a spectrophotometer 12 that measures the color of the color standard. The spectrophotometer 12 may be any commercially available spectrophotometer such as a MacBeth 7000 or 2020 that reads or obtains optical measurements of a color standard. The system 10 also comprises a color database 14 that contains a plurality of colorants and optical parameter values associated with each of the colorants. In this disclosure, the optical parameters comprise adsorption and scattering coefficients for light wavelengths from 360 nm to 780 nm by 10 nm intervals. One of ordinary skill in the art will recognize that the color database 14 may store the adsorption and scattering coefficients at other wavelengths and for other wavelength intervals. Additionally, other optical parameters such as tristimulus color coefficients could be used in place of or in addition to the adsorption and scattering coefficients.

The colorants and optical parameter values are obtained from colorant characterization batches, which are color standards developed for characterization purposes. In particular, the spectrophotometer 12 is used to measure the color of each of the colorant characterization batches. A typical plastic manufacturer may have as many as 1000 colorant characterization batches made. The optical parameters are determined by using a light scatter model that explains the relationship between the color of the colorant characterization batches, colorant concentrations and optical parameters. The light scatter model in this disclosure incorporates the Kulbelka-Munk theory, however, one of ordinary skill in the art will recognize that the model may incorporate other theories such as the Adding and Doubling theory, higher order polynomials, or even neural network type models. The Kulbelka-Munk theory describes how adsorption and scattering of colorants in a color standard relate to the visible spectral curve and its color. According to the Kulbelka-Munk theory, each colorant contributes to the adsorption and scattering of the color standard, wherein each colorant's contribution is proportional to its concentration multiplied by an adsorption and scattering coefficient. U.S. Pat. No. 6,108,095, entitled Method And System For Determining A Color Formula To Enable Reproduction Of A Color Standard On One Or More Production Lines, provides a more detailed discussion on determining optical parameters such as adsorption and scattering coefficients from the Kulbelka-Munk theory.

With regard to the colorant characterization batches, since the color of the batches and the concentration of the colorants are known, one can determine the adsorption and scattering coefficients. In this disclosure, a data fitting technique can be used to determine the adsorption and scattering coefficients from the color measurements made by the spectrophotometer 12 and the colorant concentrations. The data fitting technique may comprise a least squares fitting; however, one of ordinary skill in the art will recognize that other possible data fitting techniques may comprise neural network training, or simulated annealing.

The color database 14 also contains additional color information for each of the colorants stored therein. In particular, the color database 14 stores weathered optical parameter values for each of the colorants. Weathered optical parameter values are the adsorption and scattering coefficient values for each of the colorants after having been exposed to a variety of weathering conditions. A weatherometer 16 aids in obtaining the weathered optical parameters by performing an accelerated weathering test on the colorant characterization batches. In particular, the weatherometer 16, which may be a commercially available weatherometer or accelerated weathering test machine such as a Xeon Arc Ci65A Weather-Ometer™, exposes the colorant characterization batches to artificial and accelerated weathering tests that simulate natural weathering conditions. The weatherometer 16 uses controlled cycles of ultraviolet radiation, light, salt, electric arcs, water spray and heating elements to simulate the natural conditions of sun, rain and temperature changes. The spectrophotometer 12 measures the color of the colorant characterization batches after having been exposed to the accelerated weathering test. The weathered optical parameters are then obtained by using the Kulbelka-Munk theory. Since there are previously known values for the colorant concentrations (these values do not change as a result of the accelerated weathering test) and the color of the weathered batches is known, then one can determine the weathered optical parameters for each of the colorants using the Kulbelka-Munk theory and a data fitting technique. After the weatherometer 16 has performed the accelerated weathering test on all of the colorant characterization batches and the weathered optical parameters have been determined, the results are stored in the color database 14.

Referring again to FIG. 1, the system 10 also comprises a computing unit 18 that extracts the color data from the color database 14 and predicts how much a color standard will shift if exposed to an accelerated weathering test. This prediction will allow a color technician to know in advance with confidence if a particular color formula will meet a customer specification and satisfy an accelerated weathering test. As a result, the technician will only submit color plaques to customers based on color formulas that he or she knows will pass the accelerated weathering test. This aspect allows the plastic manufacturer to report a color match to a customer within several hours, which is significantly less than the two week turn around time currently available with conventional techniques. Below is a more detailed discussion of a color formulation tool that comprises algorithms that take into account a variety of weathering conditions and in particular, predict how much a color standard will shift after exposure to an accelerated weathering test.

Figure 2:
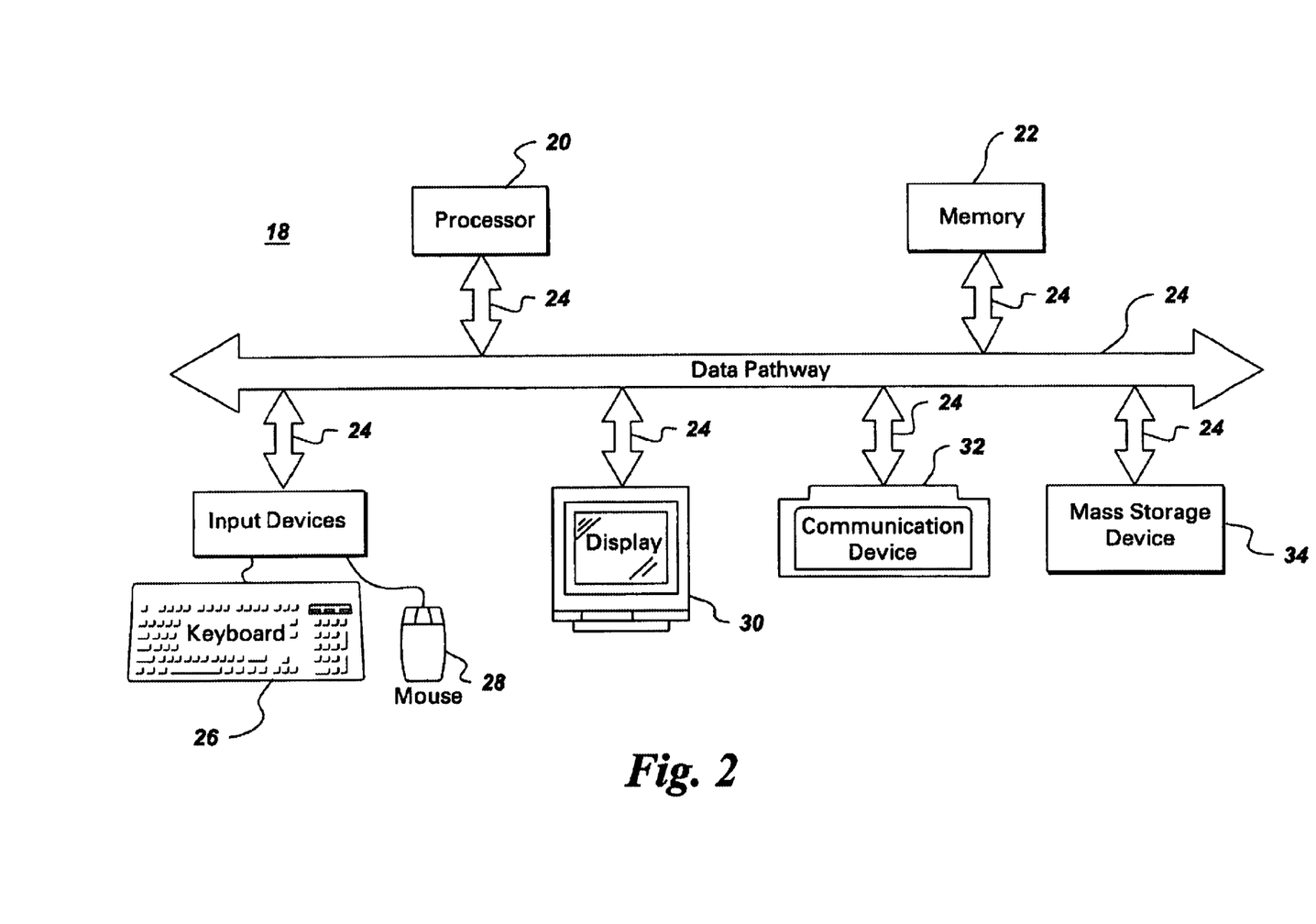
FIG. 2 shows a more detailed diagram of a general-purpose computer system that operates in the system shown in FIG. 1.

FIG. 2 shows a more detailed diagram of the computing unit 18 shown in FIG. 1. The computer unit 18 generally comprises a processor 20, memory 22, input/output devices, and data pathways (e.g., buses) 24 connecting the processor, memory and input/output devices. The processor 20 accepts instructions and data from memory 22 and performs various calculations. The processor 20 includes an arithmetic logic unit (ALU) that performs arithmetic and logical operations and a control unit that extracts instructions from memory 22 and decodes and executes them, calling on the ALU when necessary. The memory 22 generally includes a random-access memory (RAM) and a read-only memory (ROM), however, there may be other types of memory such as programmable read-only memory (PROM), erasable programmable read-only memory (EPROM) and electrically erasable programmable read-only memory (EEPROM). Also, memory 22 preferably contains an operating system, which executes on the processor 20. The operating system performs basic tasks that include recognizing input, sending output to output devices, keeping track of files and directories and controlling various peripheral devices.

The input/output devices may comprise a keyboard 26 and a mouse 28 that enter data and instructions into the computing unit 18. Also, a display 30 may be used to allow a user to see what the computing unit has accomplished. Other output devices may include a printer, plotter, synthesizer and speakers. A communication device 32 such as a telephone or cable modem or a network card such as an Ethernet adapter, local area network (LAN) adapter, integrated services digital network (ISDN) adapter, Digital Subscriber Line (DSL) adapter or wireless access card, enables the computing unit 18 to access other computers and resources on a network such as a LAN, wireless LAN or wide area network (WAN). A mass storage device 34 may be used to allow the computing unit 18 to permanently retain large amounts of data. The mass storage device may include all types of disk drives such as floppy disks, hard disks and optical disks, as well as tape drives that can read and write data onto a tape that could include digital audio tapes (DAT), digital linear tapes (DLT), or other magnetically coded media. The above-described computing unit 18 can take the form of a hand-held digital computer, personal digital assistant computer, notebook computer, personal computer, workstation, mini-computer, mainframe computer or super-computer.

Figure 3:
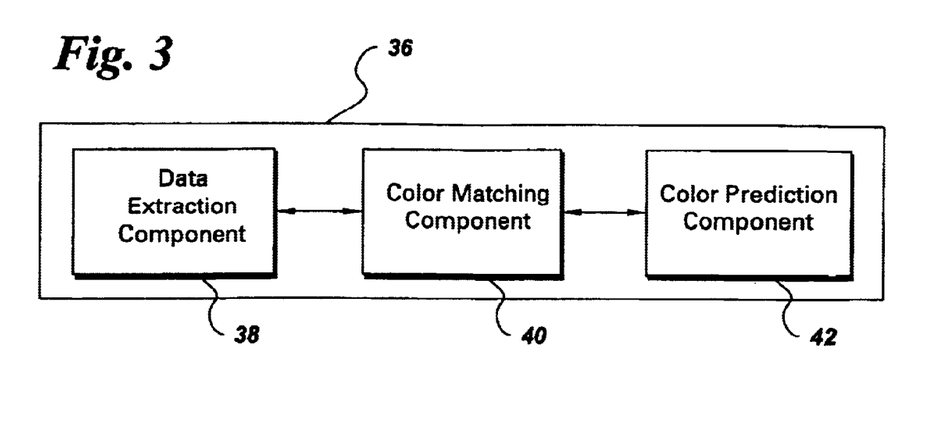
FIG. 3 shows a top-level component architecture diagram of a color formulation tool that operates on the computer system shown in FIG. 2.

FIG. 3 shows a top-level component architecture diagram of a color formulation tool 36 that operates on the computer system 18 shown in FIG. 2. The color formulation tool 36 comprises a data extraction component 38 that extracts the color data from the color database 14. The data extraction component 38 extracts the color data from the color database 14 by using commercially available modules available from Microsoft, Oracle, etc, which directly extract the data into the color formulation tool 36, however, one of ordinary skill in the art will recognize that one can write specialized code to extract the data into a common format and write additional specialized code to import that into the tool.

The color formulation tool 36 also comprises a color matching component 40 that determines color formulas that will match a color standard desired by a customer. Each color formula comprises the colorants that make up the color and the concentration of each of the colorants. Generally, the color matching component 40 receives color measurements of a color standard obtained from the spectrophotometer 12 and determines a subset of color formulas using the color data from the color database 14 that matches the color of the color standard and satisfies predetermined accelerated weathering test requirements. In this disclosure, the color matching component 40 uses a plurality of formula keys corresponding to the color spectrum of the color standard. Each of the plurality of formula keys have a different combination of colorants that formulate the color standard and satisfy predetermined accelerated test requirements. The plurality of formula keys are restricted to combinations that have a greater probability of generating a color match with the color standard and that satisfy predetermined accelerated weathering conditions. The color matching component 40 evaluates each of the plurality of formula keys in order of their probability of generating a color match with the color standard to determine whether the colorants in each formula key can be combined to reproduce the color standard and satisfy the predetermined accelerated weathering test requirements. The formula keys having a greater probability of generating a color match are evaluated prior to formula keys having a lesser probability of generating a color match. For each evaluation, the color matching component 40 generates a degree of match between the formula key and the color standard. The color matching component 40 then compares the degrees of match generated from all of the plurality of formula keys to determine the best match with the color standard. U.S. Pat. No. 5,720,017, entitled System And Method For Formulating A Color Match Using Color Keys, provides a more detailed discussion on using color keys to match a color standard. Other color matching processes are disclosed in U.S. Pat. Nos. 6,108,095; 5,668,633; 5,740,078; and 5,841,421.

Referring again to FIG. 3, the color formulation tool 36 also comprises a color prediction component 42 that predicts the shift in color of the color standard after exposure to a variety of weathering conditions. In particular, the color prediction component 42 uses the colorants and concentrations of colorants from the color formula that provides the best match with the color standard along with the color data extracted from the color database 14 (i.e., weathered color measurements and weathered optical parameters) to predict the shift in color that a standard produced from the determined color formula will experience after exposure to a variety of weathering conditions. Applying the Kulbelka-Munk theory, the color prediction component 42 determines the weathered color of the standard using the weathered optical parameters and the colorant concentrations from the determined color formula. Note that the colorant concentrations remain the same when exposed to a variety of weathering conditions and thus the colorant concentrations from the determined color formula can be used. The color prediction component 42 then compares the color produced by the determined color formula to the determined weathered color. From the comparison, the color prediction component 42 predicts the expected color shift of the color standard upon exposure to a variety of weathering conditions.

Figure 4:
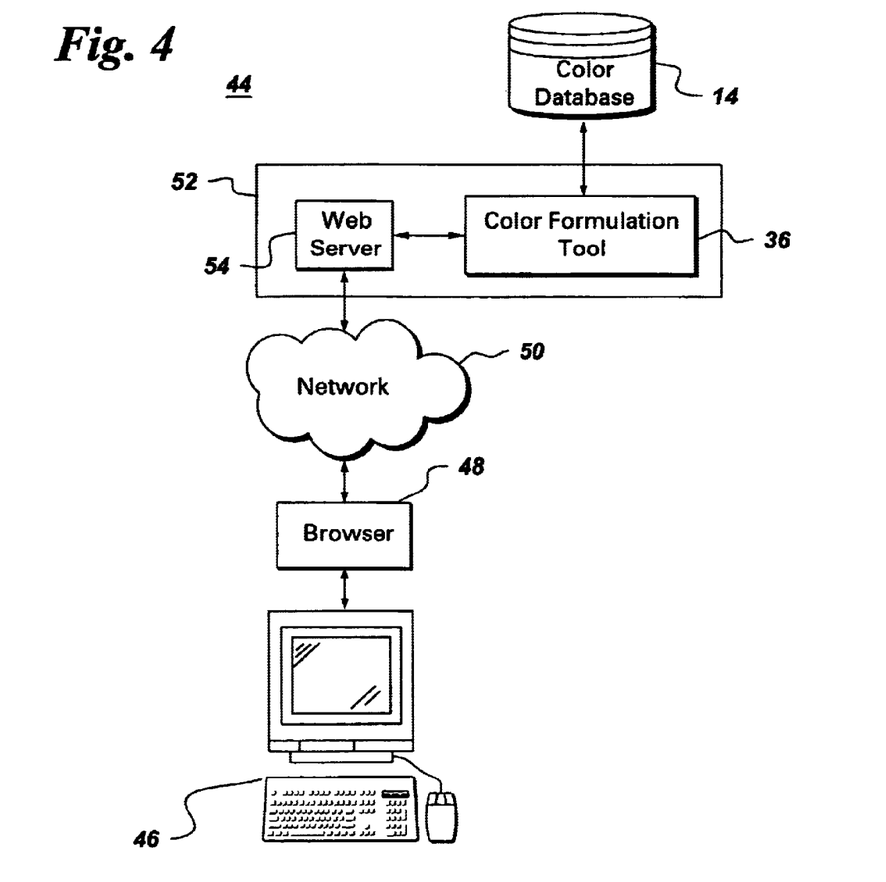
FIG. 4 shows an architectural diagram of a system for implementing the color formulation tool shown in FIG. 3 on a network.

FIG. 4 shows an architectural diagram of a system 44 for implementing the color formulation tool 36 shown in FIG. 3 on a network. In FIG. 4, a computing unit 46 allows a user to access the color formulation tool 36. The computing unit 46 can take the form of a hand-held digital computer, personal digital assistant computer, notebook computer, personal computer or workstation. The user uses a web browser 48 such as Microsoft INTERNET EXPLORER, Netscape NAVIGATOR or Mosaic to locate and display the color formulation tool 36 on the computing unit 46. A communication network 50 such as an electronic or wireless network connects the computing unit 46 to the color formulation tool 36. In particular, the computing unit 46 may connect to the color formulation tool 36 through a private network such as an extranet or intranet or a global network such as a WAN (e.g., Internet). As shown in FIG. 4, the color formulation tool 36 resides in a server 52, which comprises a web server 54 that serves the color formulation tool 36 and the color database 14 that contains the color data. However, the color formulation tool 36 does not have to be co-resident with the server 52.

If desired, the system 44 may have functionality that enables authentication and access control of users accessing the color formulation tool 36. Both authentication and access control can be handled at the web server level by the color formulation tool 36 itself, or by commercially available packages such as Netegrity SITEMINDER. Information to enable authentication and access control such as the user names, location, telephone number, organization, login identification, password, access privileges to certain resources, physical devices in the network, services available to physical devices, etc. can be retained in a database directory. The database directory can take the form of a lightweight directory access protocol (LDAP) database; however, other directory type databases with other types of schema may be used including relational databases, object-oriented databases, flat files, or other data management systems.

In this implementation, the color formulation tool 36 may run on the web server 54 in the form of servlets, which are applets (e.g., Java applets) that run a server. Alternatively, the color formulation tool 36 may run on the web server 54 in the form of CGI (Common Gateway Interface) programs. The servlets access the color database 14 using JDBC or Java database connectivity, which is a Java application programming interface that enables Java programs to execute SQL (structured query language) statements. Alternatively, the servlets may access the color database using ODBC or open database connectivity. Using hypertext transfer protocol or HTTP, the web browser 48 obtains a variety of applets that execute the color formulation tool 36 on the computing unit 46.

Figure 5:
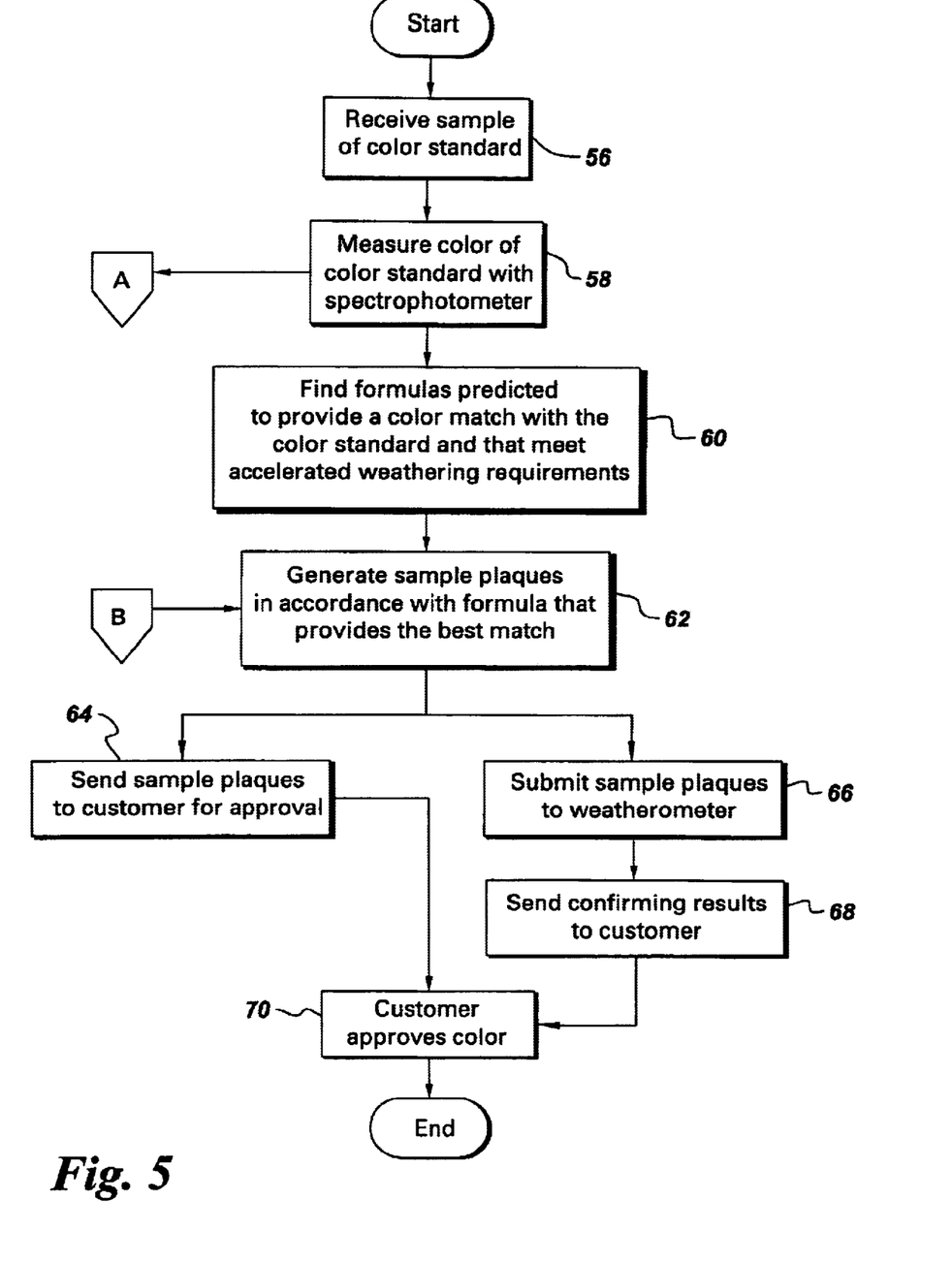
FIG. 5 shows a flow chart describing the operations performed by the system shown in FIG. 1.
Figure 6:
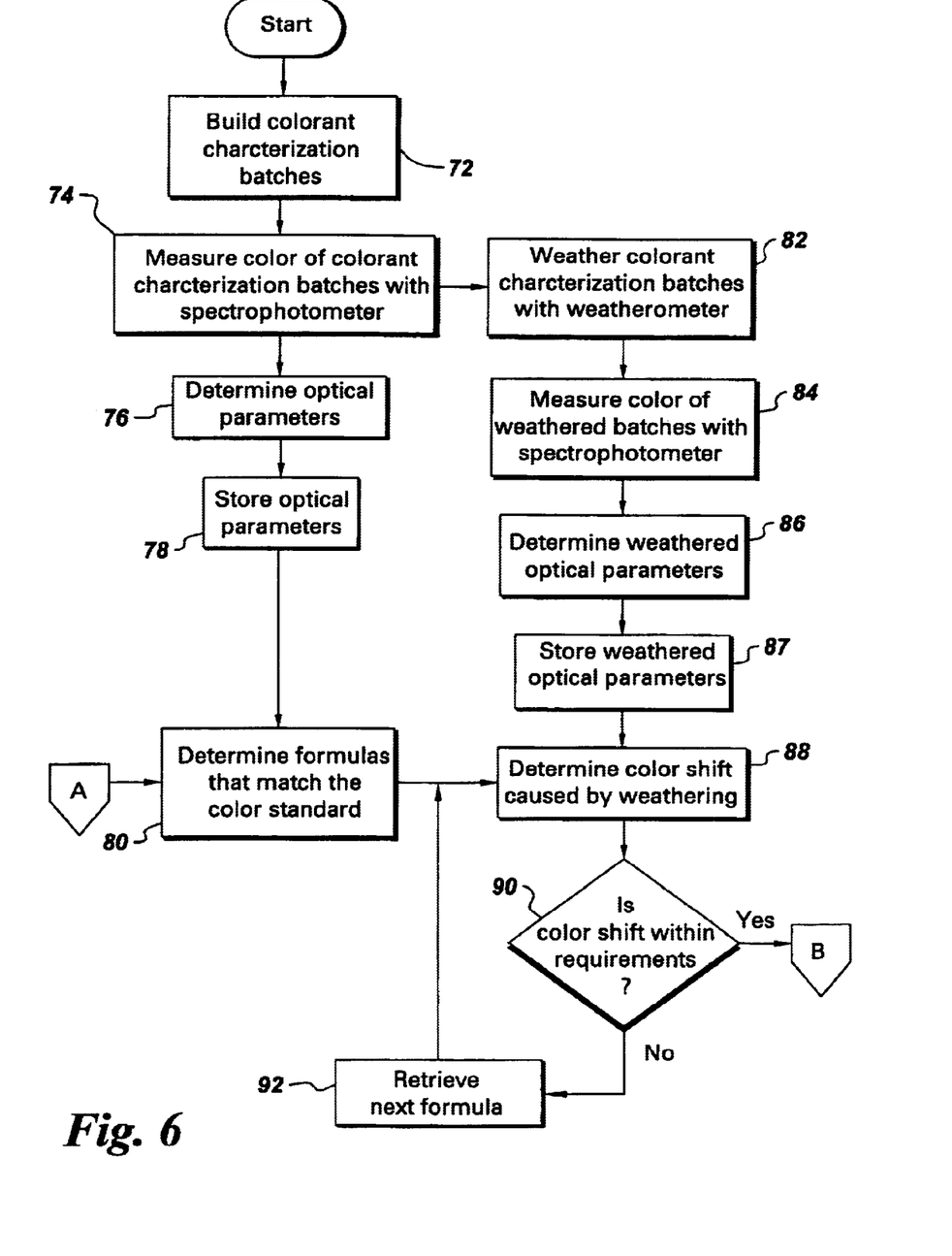
FIG. 6 shows a more detailed flow chart describing the color formulation operation shown in FIG. 5.

FIG. 5 shows a flow chart describing the operations performed by the system shown in FIG. 1. At 56, a color technician receives a sample of a color standard sent by a customer. The technician measures the color of the color standard with the spectrophotometer at 58. The technician finds color formulas that have an expectation to generate a match with the color standard sent by the customer and that meet accelerated weathering test requirements at 60. FIG. 6 provides a more detailed discussion on the formulation of color formulas that are predicted to provide a color match and meet accelerated weathering test requirements. The color technician then has samples of color plaques prepared in accordance with the color formula determined to provide the best match at 62. The color plaques are then sent to the customer for approval at 64. While the color technician is having the color plaques sent to the customer for approval, the technician exposes the plaques to an accelerated weathering test at 66. The color technician sends the results of the accelerated weathering test to the customer at 68. Once the customer receives the samples of color plaques and the results that confirm that the samples are in conformance with the accelerated weathering test requirements, then the customer approves the color formula at 70.

FIG. 6 shows a more detailed flow chart describing the color formulation operation shown in FIG. 5. At 72, the technician builds the colorant characterization batches as described above. Next, the technician uses the spectrophotometer to measure the color of the colorant characterization batches at 74. Next, the color formulation tool is used to determine the optical parameters (i.e., adsorption and scattering coefficients) of the colorant characterization batches at 76 using the Kulbelka-Munk theory. The color formulation tool then stores the optical parameters in the color database at 78. Next, the color formulation tool uses the color formula keys to generate a subset of color formulas that will match the customer's color standard and satisfy predetermined accelerated weathering test requirements at 80.

While the color formulation tool is determining the optical parameters, storing the results in the color database, and determining the color formulas, the technician exposes the colorant characterization batches to an accelerated weathering test at 82. After the accelerated weathering test is complete, the technician uses the spectrophotometer to measure the color of the weathered colorant characterization batches at 84. The color formulation tool, using the color data in the color database and the Kulbelka-Munk theory, determines the weathered optical parameters (i.e., adsorption and scattering coefficients) for the weathered colorant characterization batches at 86 and stores the values in the database at 87. The color formulation tool then predicts the color shift that the color standard will have as it is exposed to a variety of weathering conditions at 88. In particular, the color formulation tool uses the colorants and concentrations of colorants from the color formula that provides the best match with the customer's color standard along with the color data extracted from the color database (i.e., weathered color measurements and weathered optical parameters) to predict the shift in color that a standard produced from the determined color formula will experience after exposure to a variety of weathering conditions.

The color formulation tool then compares the color produced by the determined color formula to the determined weathered color. From the comparison, the color formulation tool predicts the expected color shift of the color standard upon exposure to a variety of weathering conditions. If the predicted color shift is within the predetermined requirements as determined at 90, then the technician is notified and sample plaques are generated and sent to the customer as shown in FIG. 5. Otherwise, the color formulation tool retrieves the next formula at 92 and determines the color shift at 88. Blocks 88–92 are repeated until the predicted color shift is within accelerated weathering test requirements.

The foregoing flow diagram of FIGS. 5–6 shows the functionality and operation of the color formulation tool. In this regard, the blocks that pertain to the color formulation tool represent a module, segment, or portion of code, which comprises one or more executable instructions for implementing the specified logical function(s). It should also be noted that in some alternative implementations, the functions noted in the blocks may occur out of the order noted in the figures or, for example, may in fact be executed substantially concurrently or in the reverse order, depending upon the functionality involved. Furthermore, the functions can be implemented in programming languages such as Java, however, other languages such as C/C++, Fortran, Basic, and Pascal can be used.

The above-described tool and systems comprise an ordered listing of executable instructions for implementing logical functions. The ordered listing can be embodied in any computer-readable medium for use by or in connection with a computer-based system that can retrieve the instructions and execute them. In the context of this application, the computer-readable medium can be any means that can contain, store, communicate, propagate, transmit or transport the instructions. The computer readable medium can be an electronic, a magnetic, an optical, an electromagnetic, or an infrared system, apparatus, or device. An illustrative, but non-exhaustive list of computer-readable mediums can include an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical).

Note that the computer readable medium may comprise paper or another suitable medium upon which the instructions are printed. For instance, the instructions can be electronically captured via optical scanning of the paper or other medium, then compiled, interpreted or otherwise processed in a suitable manner if necessary, and then stored in a computer memory.

It is apparent that there has been provided in accordance with this invention, a color formulation tool. While the invention has been particularly shown and described in conjunction with a preferred embodiment thereof, it will be appreciated that variations and modifications can be effected by a person of ordinary skill in the art without departing from the scope of the invention.

What is claimed is:

1. A method for predicting the color of a color standard exposed to weathering conditions, comprising:
   determining the concentration of the colorants of the color standard;
   obtaining weathered optical parameters for the color standard; and
   predicting the color of the color standard from the concentration and weathered optical parameters.

2. The method according to claim 1, wherein the weathered optical parameters comprise adsorption and scattering coefficients.

3. The method according to claim 1, wherein the predicting comprises using a light scatter model.

4. The method according to claim 3, wherein the light scatter model incorporates a Kulbelka-Munk theory.

5. The method according to claim 3, wherein the light scatter model incorporates an Adding and Doubling theory.

6. A method for predicting the shift in color of a color standard upon exposure to weathering conditions, comprising:
   measuring the color of the color standard;
   determining a color formula that matches the color standard;
   obtaining weathered optical parameters corresponding to the colorants and concentration of colorants used in the color formula;
   applying a light scatter model to the weathered optical parameters and colorant concentrations to determine the weathered color for color standard; and
   predicting the shift in color of the color standard upon exposure to weathering conditions from the weathered color.

7. The method according to claim 6, wherein the weathered optical parameters comprise adsorption and scattering coefficients.

8. The method according to claim 6, wherein the predicting comprises comparing the weathered color to the color generated from the color formula.

9. A method for determining a color formula that matches a color of a color standard and satisfies accelerated weathering test requirements, comprising:
   receiving a sample of the color standard;
   measuring the color of the color standard; and
   determining a color formula that produces the measured color and satisfies accelerated weathering test requirements.

10. The method according to claim 9, wherein the determining of a color formula comprises producing colorant characterization batches.

11. The method according to claim 10, further comprising measuring the color of the colorant characterization batches.

12. The method according to claim 11, further comprising applying a light scattering model to determine the optical parameters of the colorant characterization batches.

13. The method according to claim 12, further comprising using the optical parameters and the measured color of the color standard with the light scattering model to determine a color formula that matches the color standard.

14. The method according to claim 13, further comprising submitting the colorant characterization batches to an accelerated weathering test that exposes the batches to various weathering conditions.

15. The method according to claim 14, further comprising measuring the color of the colorant characterization batches after undergoing the accelerated weathering test.

16. The method according to claim 15, further comprising applying a light scattering model to the weathered colorant characterization batches to determine the weathered optical parameters of the batches.

17. The method according to claim 16, further comprising predicting the color shift for the color formula due to weathering.

18. The method according to claim 17, wherein the predicting of color shift comprises obtaining weathered optical parameters corresponding to the colorants and concentration of colorants used in the color formula.

19. The method according to claim 18, further comprising applying a light scatter model to the weathered optical parameters and colorant concentrations to determine the weathered color for the color formula.

20. The method according to claim 19, further comprising comparing the weathered color to the color generated from the color formula.

21. A method for predicting the shift in color of a color standard upon exposure to weathering conditions, comprising:
   inputting a color measurement of the color standard;
   determining a color formula that matches the color standard;
   obtaining weathered optical parameters corresponding to the colorants and concentration of colorants used in the color formula;
   applying a light scatter model to the weathered optical parameters and colorant concentrations to determine the weathered color for the color standard; and
   predicting the shift in color of the color standard upon exposure to weathering conditions from the weathered color.

22. The method according to claim 21, wherein the predicting comprises comparing the weathered color to the color generated from the color formula.

23. The method according to claim 21, wherein the light scattering model incorporates at least one of a Kulbelka-Munk theory and Adding and Doubling theory.

24. The method according to claim 21, wherein the weathered optical parameters comprise adsorption and scattering coefficients.

25. A system for predicting the color of a standard exposed to weathering conditions, comprising:
   means for measuring the color of the color standard;
   means for determining a color formula that matches the color standard;
   means for obtaining weathered optical parameters corresponding to the colorants and concentration of colorants used in the color formula;

means for applying a light scatter model to the weathered optical parameters and colorant concentrations to determine the weathered color for color standard; and means for predicting the shift in color of the color standard upon exposure to weathering conditions from the weathered color.

26. The system according to claim 25, wherein the weathered optical parameters comprise adsorption and scattering coefficients.

27. The system according to claim 25, wherein the light scatter model incorporates a Kulbelka-Munk theory.

28. The system according to claim 25, wherein the light scatter model incorporates an Adding and Doubling theory.

29. A system for determining a color formula that matches a color of a color standard and satisfies accelerated weathering test requirements, comprising:

a spectrophotometer that measures the color of the color standard;

a color database containing a plurality of colorants and optical parameters and weathered optical parameters associated with each of the colorants; and a computing unit, coupled to the spectrophotometer and color database, that determines a color formula that produces the measured color and satisfies accelerated weathering test requirements.

30. The system according to claim 29, wherein the computing unit uses a plurality of color formula keys to generate a color formula from the data stored in the color database that matches the color of the color standard and satisfies accelerated weathering test requirements.

31. The system according to claim 30, wherein the computing unit predicts color shifts for the color formula due to weathering conditions.

32. The system according to claim 31, wherein the computing unit predicts a color shift for the color formula by obtaining weathered optical parameters corresponding to the colorants and concentration of colorants used in the color formula, applies a light scatter model to the weathered optical parameters and colorant concentrations to determine the weathered color for the color formula and compares the weathered color to the color generated from the color formula.

33. A color formulation tool, comprising:

a data extraction component that extracts color data from a color database;

a color matching component that determines a color formula that matches the color of a color standard and satisfies accelerated weathering test requirements from the extracted color data; and a color prediction component that predicts the shift in color for the color formula due to weathering.

34. The tool according to claim 33, wherein the color matching component uses a plurality of color formula keys to generate the color formula.

35. The tool according to claim 34, wherein the color prediction component predicts a color shift for the color formula by obtaining weathered optical parameters corresponding to colorants and concentration of colorants used in the color formula, applies a light scatter model to the weathered optical parameters and colorant concentrations to determine the weathered color for the color formula and compares the weathered color to the color generated from the color formula.

36. A computer-readable medium storing computer instructions for instructing a computer system to predict the color of a color standard exposed to weathering conditions, the computer instructions comprising:

determining the concentration of the colorants of the color standard;

obtaining weathered optical parameters for the color standard; and predicting the color of the color standard from the concentration and weathered optical parameters.

37. The computer-readable medium according to claim 36, wherein the weathered optical parameters comprise adsorption and scattering coefficients.

38. The computer-readable medium according to claim 36, wherein the predicting comprises instructions for using a light scatter model.

39. The computer-readable medium according to claim 38, wherein the light scatter model incorporates a Kulbelka-Munk theory.

40. The computer-readable medium according to claim 38, wherein the light scatter model incorporates an Adding and Doubling theory.

41. A computer-readable medium storing computer instructions for instructing a computer system tc predict the shift in color of a color standard upon exposure to weathering conditions, the computer instructions comprising:

measuring the color of the color standard;

determining a color formula that matches the color standard;

obtaining weathered optical parameters corresponding to the colorants and concentration of colorants used in the color formula;

applying a light scatter model to the weathered optical parameters and colorant concentrations to determine the weathered color for color standard; and predicting the shift in color of the color standard upon exposure to weathering conditions from the weathered color.

42. The computer-readable medium according to claim 41, wherein the weathered optical parameters comprise adsorption and scattering coefficients.

43. The computer-readable medium according to claim 41, wherein the predicting comprises instructions for comparing the weathered color to the color generated from the color formula.

44. A computer-readable medium storing computer instructions for instructing a computer system to determine a color formula that matches a color of a color standard and satisfies accelerated weathering test requirements, the computer instructions comprising:

receiving a sample of the color standard;

measuring the color of the color standard; and determining a color formula that produces the measured color and satisfies accelerated weathering test requirements.

45. The computer-readable medium according to claim 44, wherein the determining of a color formula comprises instructions for producing colorant characterization batches.

46. The computer-readable medium according to claim 45, further comprising instructions for measuring the color of the colorant characterization batches.

47. The computer-readable medium according to claim 46, further comprising instructions for applying a light scattering model to determine the optical parameters of the colorant characterization batches.

48. The computer-readable medium according to claim 47, further comprising instructions for using the optical parameters and the measured color of the color standard with the light scattering model to determine a color formula that matches the color standard.

49. The computer-readable medium according to claim 48, further comprising instructions for submitting the colorant characterization batches to an accelerated weathering test that exposes the batches to various weathering conditions.

50. The computer-readable medium according to claim 49, further comprising instructions for measuring the color of the colorant characterization batches after undergoing the accelerated weathering test.

51. The computer-readable medium according to claim 50, further comprising instructions for applying a light scattering model to the weathered colorant characterization batches to determine the weathered optical parameters of the batches.

52. The computer-readable medium according to claim 51, further comprising instructions for predicting the color shift for the color formula due to weathering.

53. The computer-readable medium according to claim 52, wherein the predicting of color shift comprises instructions for obtaining weathered optical parameters corresponding to the colorants and concentration of colorants used in the color formula.

54. The computer-readable medium according to claim 53, further comprising instructions for applying a light scatter model to the weathered optical parameters and colorant concentrations to determine the weathered color for the color formula.

55. The computer-readable medium according to claim 54, further comprising instructions for comparing the weathered color to the color generated from the color formula.

56. A computer-readable medium storing computer instructions for instructing a computer system to predict the shift in color of a color standard upon exposure to weathering conditions, the computer instructions comprising:

inputting a color measurement of the color standard;

determining a color formula that matches the color standard;

obtaining weathered optical parameters corresponding to the colorants and concentration of colorants used in the color formula;

applying a light scatter model to the weathered optical parameters and colorant concentrations to determine the weathered color for the color standard; and predicting the shift in color of the color standard upon exposure to weathering conditions from the weathered color.

57. The computer-readable medium according to claim 56, wherein the predicting comprises instructions for comparing the weathered color to the color generated from the color formula.

58. The computer-readable medium according to claim 56, wherein the light scattering model incorporates at least one of a Kulbelka-Munk theory and Adding and Doubling theory.

59. The computer-readable medium according to claim 56, wherein the optical parameters and weathered optical parameters comprise adsorption and scattering coefficients.

* * * * *